(12) United States Patent
Gießibl

(10) Patent No.: US 10,488,278 B2
(45) Date of Patent: Nov. 26, 2019

(54) PLANAR MAGNETOELASTIC FORCE SENSOR

(71) Applicant: Methode Electronics Malta Ltd., Mriehel (MT)

(72) Inventor: Johannes Gießibl, Amerang (DE)

(73) Assignee: METHODE ELECTRONICS MALTA LTD., Mriehel (MT)

( * ) Notice: Subject to any disclaimer, the term of this patent is extended or adjusted under 35 U.S.C. 154(b) by 271 days.

(21) Appl. No.: 15/267,814

(22) Filed: Sep. 16, 2016

(65) Prior Publication Data

US 2017/0089772 A1 Mar. 30, 2017

(30) Foreign Application Priority Data

Sep. 24, 2015 (DE) .................. 10 2015 116 202
Sep. 24, 2015 (DE) .................. 20 2015 105 069 U

(51) Int. Cl.
*G01L 1/12* (2006.01)
*G01L 5/00* (2006.01)
*G01L 5/10* (2006.01)

(52) U.S. Cl.
CPC ............... *G01L 1/127* (2013.01); *G01L 5/00* (2013.01); *G01L 5/101* (2013.01)

(58) Field of Classification Search
CPC .................................. G01L 1/127; G01L 5/00
See application file for complete search history.

(56) References Cited

U.S. PATENT DOCUMENTS

| | | | | |
|---|---|---|---|---|
| 3,577,108 A * | 5/1971 | Bengtson | ................ | G01L 1/125 310/26 |
| 3,664,187 A * | 5/1972 | Goransson | .............. | G01L 1/125 73/862.69 |
| 3,866,462 A * | 2/1975 | Fraudin | ................... | G01L 3/102 73/779 |
| 4,088,013 A * | 5/1978 | Dahle | ...................... | G01B 7/24 73/779 |
| 4,364,278 A * | 12/1982 | Horter | ..................... | G01L 3/105 324/209 |
| 4,920,806 A * | 5/1990 | Obama | .................... | G01B 7/24 324/209 |
| 4,979,395 A * | 12/1990 | Pratt | ....................... | G01L 1/125 324/209 |
| 5,195,377 A * | 3/1993 | Garshelis | ................ | G01L 1/125 324/209 |
| 5,351,555 A * | 10/1994 | Garshelis | ................ | G01L 3/102 336/30 |
| 5,394,756 A * | 3/1995 | Gustafsson | ............ | G01L 1/125 73/862.69 |
| 5,883,312 A * | 3/1999 | Hayashida | ............. | G01G 19/08 73/862.333 |

(Continued)

*Primary Examiner* — Nathaniel T Woodward
(74) *Attorney, Agent, or Firm* — Thompson Coburn LLP

(57) ABSTRACT

A sensor is configured to detect a tensile, compressive and/or bending forces acting on a carrier (1, 1') of the sensor. The carrier (1,1') has at least one planar magnetizable surface (2). The sensor (13) comprises at least two sensor coils (12, 15) which are arranged at a predetermined angle to a longitudinal axis (14) of the carrier (1, 1'). The sensor (13) may be positioned on either side of the carrier (1, 1'). The sensor (13) is capable of detecting changes of the magnetisation due to tensile, compressive and/or bending forces acting on the carrier (1, 1').

17 Claims, 5 Drawing Sheets

(56) References Cited

U.S. PATENT DOCUMENTS

| | | | | |
|---|---|---|---|---|
| 5,894,409 | A * | 4/1999 | Tanaka | G01G 19/08 174/254 |
| 6,220,105 | B1 * | 4/2001 | Cripe | G01L 1/125 73/862.333 |
| 6,513,395 | B1 * | 2/2003 | Jones | G01L 3/102 73/862.333 |
| 6,880,408 | B1 * | 4/2005 | Madden | G01L 1/127 73/782 |
| 7,051,602 | B2 * | 5/2006 | Nakane | G01L 5/221 73/862.333 |
| 7,493,831 | B2 * | 2/2009 | Varonis | F16C 19/52 73/862.333 |
| 9,212,958 | B2 * | 12/2015 | Campbell | G01L 1/122 |
| 9,618,408 | B2 * | 4/2017 | Lu | G01L 3/102 |
| 2002/0092358 | A1 * | 7/2002 | Hanisko | G01L 3/102 73/779 |
| 2009/0001974 | A1 * | 1/2009 | Sheiretov | G01L 1/125 324/209 |
| 2010/0127698 | A1 * | 5/2010 | Shimada | G01L 1/125 324/209 |
| 2011/0308330 | A1 * | 12/2011 | May | B66B 1/3492 73/862.69 |
| 2012/0126833 | A1 * | 5/2012 | Dooley | G01N 3/066 324/657 |
| 2013/0091954 | A1 * | 4/2013 | Ullakko | G01L 1/127 73/779 |
| 2013/0091960 | A1 * | 4/2013 | Lee | G01L 3/1435 73/862.335 |
| 2014/0260686 | A1 * | 9/2014 | Moran | G01L 3/102 73/862.335 |
| 2014/0360282 | A1 | 12/2014 | Gie ibl | |
| 2015/0006054 | A1 * | 1/2015 | Hofmann | F03D 17/00 701/71 |

* cited by examiner

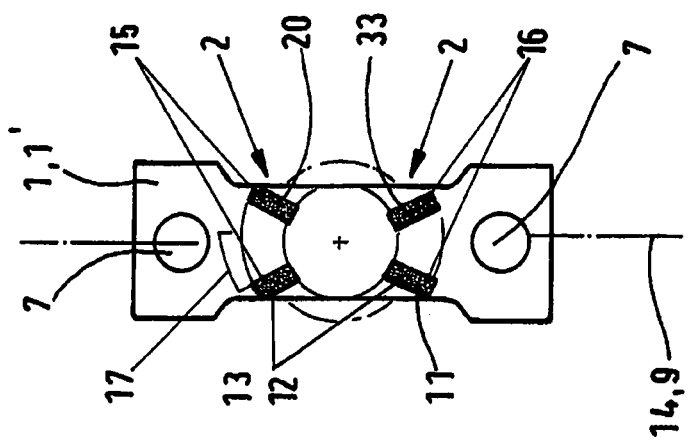
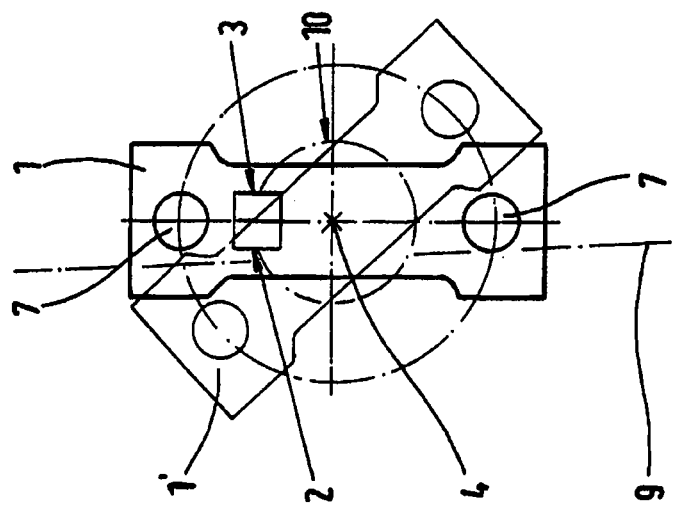
Figure 1

PLANAR MAGNETOELASTIC FORCE SENSOR

RELATED APPLICATION DATA

This application claims priority to German patent applications DE 10 2015 116 202.4 filed on Sep. 24, 2015 and DE 20 2015 105 069.0 filed on Sep. 24, 2015, the disclosures of which are incorporated by reference herein.

BACKGROUND

US 2014/0360282 A1 discloses a magnetoelastic sensor which has a shaft extending in the longitudinal direction. A magnetoelastically active region is arranged on the shaft. The magnetization is directly or indirectly generated on the shaft or applied to the shaft. Stress applied to the shaft is transmitted to the magnetization. A magnetic field sensor arranged in the region of the magnetization generates a signal reflecting the change of the magnetic field due to the stress applied to the shaft.

A magnetic field sensor measures the magnetic flux density of the magnetic field and transmits it in an analysable form preferably to an electronic device for signal processing. The magnetic flux density is measured in the unit T (Tesla).

Sensors may be classified according to their operation principle, for example into magnetic, optical, inductive and mechanical sensors.

In the following, a magnetic sensor will be assumed by way of example.

Magnetic field sensors are, for example, used in the form of fluxgates, Hall probes or potential coils.

Furthermore, a magnetic field sensor, preferably a fluxgate sensor, will be assumed by way of non-limiting example.

Magnetic field sensors work in a contactless manner and thus without external mechanical operating force.

Another possibility to classify sensors is the classification according to the respective measurable variable, such as path, compression, tension, distance, temperature, pH value or luminous intensity.

Preferably, magnetic field sensors may be used as compression sensors, tension sensors or bending sensors. However, the above listing is only exemplary and not meant to be exclusive.

Magnetic field sensors are used, for example, in vehicle manufacturing as well as in the manufacturing of electric tools and electric household appliances. Preferably, they serve the purpose of controlling mechanical processes. They are gaining importance in the context of higher safety and quality requirements, for example when measuring different physical parameters.

Magnetic field sensors are preferably used in measurement, test and control devices. In addition, magnetic field sensors are used in machinery and equipment as well as for the speed control of electric motors.

The evaluation of the signal generated by the magnetic field on the respective sensor is carried out continuously in an analogue or digital manner or by means of integrated or downstream electronics.

In the prior art, the magnetization required for the functioning of the magnetoelastic sensor is preferably applied to a cylindrical body.

A cylindrical body can be used in a compression and/or tension sensor as a carrier of the magnetic field for determining compressive and/or tensile forces.

Therefore, the invention is based on the problem to provide a magnetoelastic sensor which may be used as a compression and/or tension and/or bending sensor.

SUMMARY

Carrier

The term "carrier" refers to a metal body preferably extending in a plane and including at least one magnetizable flat metal surface.

Particularly preferably, the carrier is formed as a single flat metal part having at least one flat magnetizable surface.

Preferably, at least one magnetizable flat metal surface is arranged both on the front side and on the back side of the carrier.

Preferably, the flat metal surface of the carrier is arranged between the two ends of the body.

At least in the region of its magnetizable flat metal surface, the carrier is made of a magnetizable metal alloy of iron and/or nickel and/or chrome and/or cobalt.

The carrier may also have a different material composition.

The magnetizable carrier may be provided with a coating. In the case of magnetization, the coating applied to the carrier or the carrier itself may be a carrier of the magnetization.

Preferably, but not exclusively, the carrier has a rectangular shape. The carrier may, however, also be circular or oval or of any other geometric shape.

The invention provides that, instead of a rectangular shape, the carrier may have the shape of a disc. Preferably, the disc has an annular outer circumference.

The carrier may be configured in the form of a block, a disc, a ring, a rotor or a tape.

Particularly preferably, the carrier is a flat, plate-shaped, planar body extending in an imaginary geometric plane.

A bore may be arranged in the centre of the disc. Preferably for measuring a contact pressure, the disc can, for example, be slipped onto the shaft of a screw by means of the bore.

In order to arrange the tension and/or compression and/or bending sensor in a device in which a tensile and/or compressive and/or bending force applied to the carrier is measured, a fastening device is attached respectively at an outer end of the carrier.

The sensor has at least two coils which in turn serve the purpose of collecting and transmitting information relating to the magnetization applied to the carrier and the changes thereof.

In addition, the sensor is understood to mean the aforementioned at least two coils, their arrangement and/or alignment in the viewing direction towards the carrier, the connections and the signal receiver, the evaluation unit, the indicator device or parts thereof.

The sensor device comprises the sensor itself, a metal carrier and/or connecting wires and/or a signal receiver and/or an evaluation unit.

Preferably, the ends of the carrier are arranged opposite one another.

In the event that a compressive force, a tensile force or a bending force acts on the carrier, this stress is transmitted via the magnetized surface of the carrier.

Magnetization

Preferably, the magnetization is applied to the flat metal surface of the carrier by means of a permanent magnet or electric current. A magnetization, preferably in the form of a magnetic track, is generated on the carrier.

The method for magnetizing the at least one flat metal surface of the carrier is characterised by the following steps.

Positioning of a magnet, preferably a permanent magnet, in the region of the at least one magnetizable flat metal surface of the carrier.

The magnet and the at least one flat metal surface are preferably arranged in two planes which are parallel to one another.

In the respectively associated plane, the magnet is preferably rotated about its own axis relative to the carrier, or the carrier is rotated about its own axis relative to the magnet.

Due to the movement of the magnet relative to the carrier or due to the movement of the carrier relative to the magnet, a magnetization, preferably in the form of an approximately annular magnetic track, is generated on the magnetizable flat metal surface.

According to the invention, the magnetization of the flat metal surface produces a circumferential closed magnet track in the form of a closed circular path on the carrier. The circular path has the shape of a ring. The magnetization may, however, also have a different geometric configuration.

For example, an open circular path, for instance in the form of a semicircle, a horseshoe, an ellipse or the like, may be used instead of a closed circular path. As another alternative, a magnetization in the form of two parallel magnetic tracks extending along and offset in relation to the longitudinal axis of the carrier is, for example, possible.

A basic idea of the invention is to apply the magnetization to the carrier in an arrangement allowing a positioning of at least two magnetic coils offset in relation to the longitudinal axis of the carrier.

Accordingly, the positioning of the at least two magnetic coils at an angle to the longitudinal axis of the carrier and the detection of the magnetization by the coils should be made possible.

The magnetization as well as the positioning of the at least two magnetic coils thus take place on both sides of the longitudinal axis of the carrier.

In its center, the magnetic track has a region which is not magnetized. The non-magnetised center is configured in the form of a circle and surrounded by the annular magnetic track along its outer circumference.

The at least one magnetizable flat surface is preferably magnetized by means of a permanent magnet. The permanent magnet is a magnet which is preferably made of a piece of magnetically hard material. Preferably, the magnetically hard material has an alloy containing iron and/or cobalt and/or nickel.

The permanent magnet has a static magnetic field, without an electric current flow being necessary as in the case of an electromagnet. On their surfaces, permanent magnets have one or more north and south poles, respectively.

Before the at least one flat metal surface is magnetised, the magnetic domains of the flat metal surface are aligned in a non-uniform manner.

With the magnetization of the at least one flat metal surface, the magnetic domains of the metal surface change their direction, thereby generating a magnetization of the flat surface, in particular in the form of a magnetic track.

The magnetization can take place on both sides of the longitudinal axis of the flat surface of the carrier.

The magnetic field sensor comprises at least two coils. In case of tensile and/or compressive stresses, the magnetic field arranged in the region of the sensor coil, in particular the magnetic track, causes a change of the magnetic field, which is measured by the coils.

At least two sensor coils of a sensor are assigned to each of the magnetized flat metal surfaces. The magnetic track and the at least two coils of the sensor are arranged to each other in predetermined positions.

In the event that the magnetized flat metal surface of the carrier is subjected to a tensile, compressive or bending stress on the carrier, the at least two coils of the magnetic field sensor generate a signal.

The tensile stress and/or the compressive stress and/or the bending stress on the at least one magnetized flat metal surface of the carrier causes a change of the magnetic field of the flat surface. As a result, the at least one signal generated by means of the sensor coil and the evaluation electronics changes.

When a tensile force acts on preferably two magnetized metal surfaces which are preferably arranged opposite one another, the sensor coils measure a tensile stress on both sides of the carrier.

The magnetization of the carrier may be applied to at least one flat surface of the carrier. It is, however, also possible to provide two flat surfaces of the carrier with magnetizations. The magnetizations may be applied in each case on the front side and/or on the back side of the carrier.

In the event that a compressive force or a tensile force or a bending force is applied to the carrier, the stress acts on the magnetized region by the respective force. The change of the magnetic field resulting therefrom is measured by the senor coils. If the sensor coils are arranged only on one side of the carrier, it is then not possible to differentiate whether a stress is concerned which is due to the application of a compressive force, a tensile force or a bending force.

The magnetic field generated by the respective compressive force or tensile force or bending force acts on the sensor coils of both carrier sides if the sensor coils are arranged on both sides of the carrier.

In addition, the sensor device is suitable for use as a bending sensor if the carrier has a magnetised flat metal surface in particular on each of two sides opposite one another and if at least two sensor coils of a sensor are assigned to each of the two magnetizations opposite one another.

If the bending of the carrier takes place around an axis extending transversely through the carrier, the preferably two sensor coils of the sensor located on the concave side of the carrier signalise a tensile stress on the magnetic track.

In contrast, the at least two sensor coils arranged on the convex side of the carrier signalise a compressive stress acting on the magnetic track.

The tensile stress acting on the magnetization of the one side of the carrier and the compressive stress acting on the magnetization of the other side of the carrier are each detected individually by means of the associated sensor coils. The respective tension and compression signals are combined in the evaluation electronics and output either as a tensile, compressive and/or bending stress of the carrier.

Magnetic Field Sensor

If preferably a compressive stress or a tensile stress or a bending stress acts on a magnetised region, a change of the magnetic field is caused, which is measured by the sensor.

At least two sensor coils are arranged respectively in the region of at least one magnetised surface.

The sensor may be positioned on either side of the carrier.

The two sensor coils are arranged in relation to each other and in relation to a longitudinal axis of the carrier at a predetermined angle.

At least two coils form a pair of coils. The distance of the coils of the pairs of coils from each other and the arrangement of the pairs of coils in relation to each other is dependent on the length and/or the width of the carrier.

The distance of the sensor coils from each other may be determined by the diameter of the producible magnetisation.

The sensor coils are arranged in pairs in a plane extending axially parallel to the carrier.

Due to the change of the setting angle of the arrangement of the sensor coils and/or the pairs of sensor coils in relation to the longitudinal axis of the carrier in the plane of the sensor coils, the sensitivity of the sensors is modifiable.

The sensor coils may be fixed in position relative to the longitudinal axis of the carrier by means of at least one positioning device.

Merely by way of non-limiting example, a sensitivity of the sensors of 6.36 mV/kN may be obtained in a 0-degree position of the sensor coils to the longitudinal axis of the carrier.

In an arrangement of the sensor coils at an angle of 90 degrees to the longitudinal axis of the carrier, however, a sensitivity of the sensors of 1.54 mV/kN may be obtained.

An optimisation of the sensitivity value of the sensors with a value of 11.9 mV/kN may be achieved when the sensor coils are arranged at an angle of 45 degrees to the longitudinal axis of the carrier.

The aforementioned sensitivity values are to be considered as relative indicators.

The invention assumes that the sensitivity values decrease (ratiometrically) in case of a more massive component and increase (also ratiometrically) in case of a thinner component.

A further preferred embodiment provides that the distance of the sensor coils from each other is determined by the diameter of the magnetisation of the flat metal surface.

DESCRIPTION OF THE FIGURES

The invention will be described below in greater detail with reference to two exemplary embodiments, in the drawings of which:

FIG. 1 shows a carrier when being magnetized by means of a magnet, and a carrier with pairs of sensor coils;

DETAILED DESCRIPTION

Figure 2:
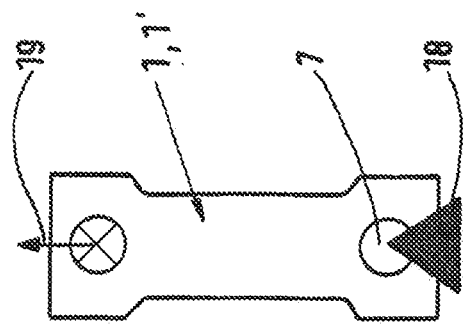
FIG. 2 shows a carrier when a force is applied.

FIG. 1 shows a carrier 1, 1' which, for the magnetization of a flat metal surface 2 of the carrier 1, 1', is rotatable about a rotational axis 4 in relation to a magnet 3, or in relation to which the magnet 3 can be rotated for the purpose of magnetization.

The illustration of FIG. 1 which is on the left when viewed from the top shows the carrier 1 having a bore 7 at each of its two ends for fastening a suspension device 8 (not shown) respectively.

In both illustrations of FIG. 1, the carrier 1 extends in a plane 9.

The magnet 3 is arranged in a plane 10. In the illustrations of FIG. 1, the planes 9 and 10 are arranged parallel to one another.

In the illustration on the right of FIG. 1, the carrier 1 is arranged in the plane 9.

Sensor coils 12, 15 of a sensor 13 are shown in plan view in front of the carrier 1 in a plane 11.

Relative to a longitudinal axis 14 of the carrier 1, the sensor coils 12, 15 are shown as pairs of coils 20, 33.

In FIG. 1, the two pairs of sensor coils 20, 33 are arranged at a 45-degree angle 17 to the longitudinal axis 14 of the carrier 1.

FIG. 2 shows the carrier 1, 1' which is attached at a point 18 via the bore 7.

A tensile force acting on the carrier 1, 1' is indicated by an arrow 19.

Figure 3:
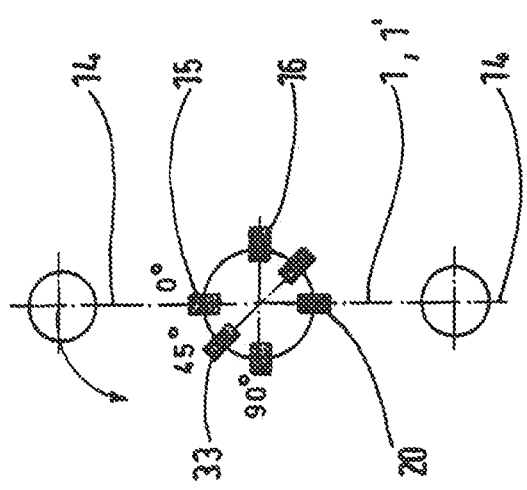
FIG. 3 shows pairs of sensor coils at respectively predetermined angles to the longitudinal axis of the carrier.

FIG. 3 shows a schematic view of the longitudinal axis 14 of the carrier 1.

A plan view of the longitudinal axis 14 of the carrier 1 shows three pairs of sensor coils 20, 33, 16.

The pair of sensor coils 20 extends at an angle of 0 degrees in relation to the longitudinal axis 14 of the carrier 1, 1'.

The pair of sensor coils 33 extends approximately at a 45-degree angle 17 to the longitudinal axis 14 of the carrier 1, 1'.

The pair of sensor coils 16 is shown at an angle of 90 degrees relative to the longitudinal axis 14 of the carrier 1, 1'.

Figure 4:
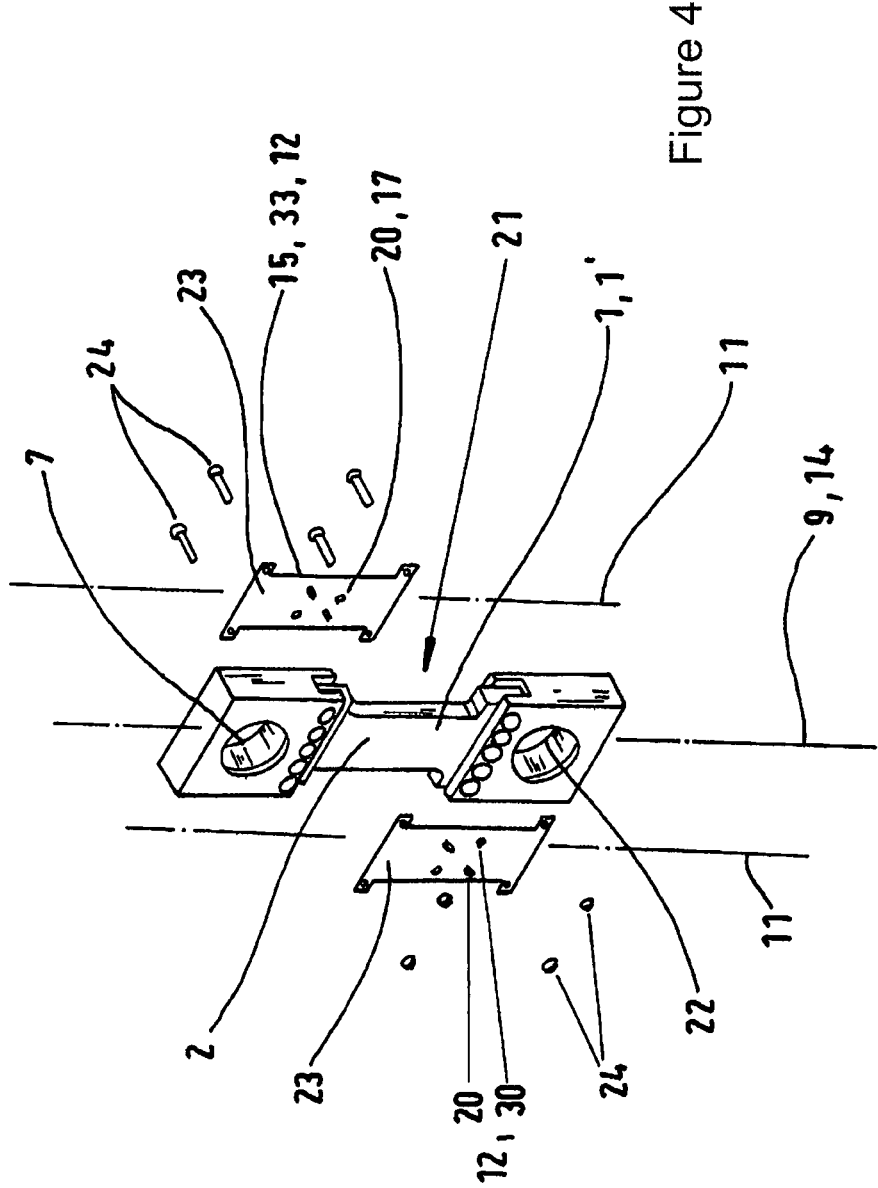
FIG. 4 shows a carrier with two flat metal surfaces and with sensor coils associated with the respective flat surfaces.

FIG. 4 shows a carrier 1, 1' having a flat metal surface 2, 21 respectively.

The surfaces 2, 21 are each arranged opposite one another on the front side and on the back side of the carrier 1, 1'.

At its two ends, the carrier 1, 1' has a respective bore 7, 22 at which suspension devices 8 (not shown) may be arranged.

The carrier 1 extends in the plane 9.

On each side of the carrier 1, two pairs of sensor coils 20, 33 each extend in two planes 11 at a 45-degree angle 17 to the longitudinal axis 14 of the carrier 1.

Positioning devices on either side of the carrier 1 are denoted by reference numeral 23.

The positioning devices 23 secure the pairs of sensor coils 20, 33 at their respective angle to the longitudinal axis 14 of the carrier 1, 1'.

FIG. 4 shows fastening means 24 by means of which the positioning devices 23 and the pairs of sensor coils 20, 33 are secured in their planes 11 towards the carrier 1, 1'.

Figure 5:
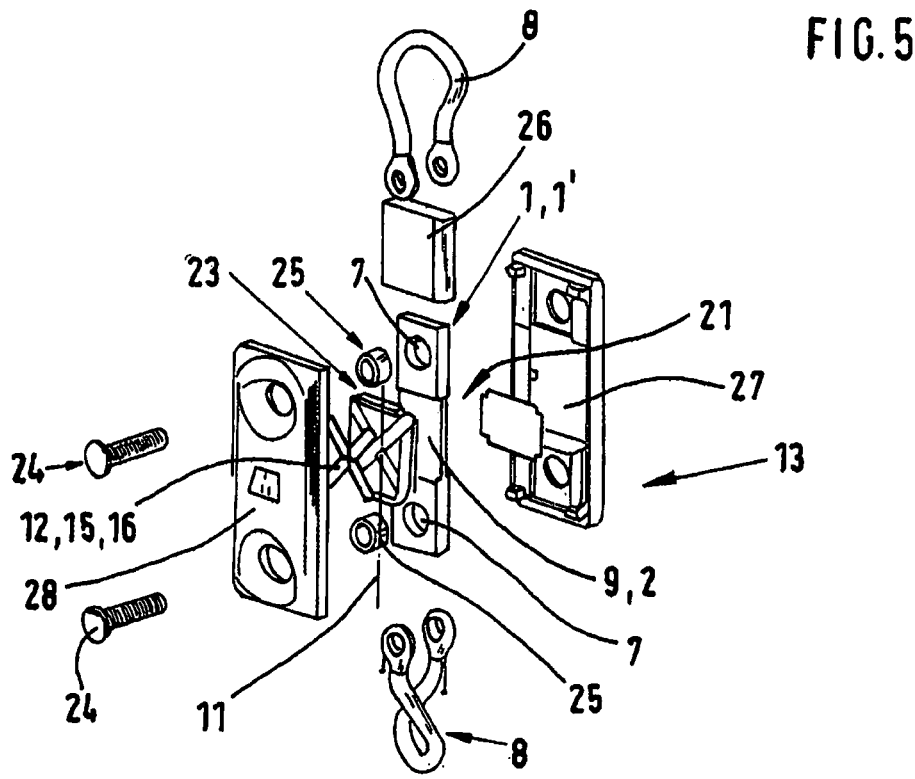
FIG. 5 shows an exploded view of a first embodiment of a sensor.

FIG. 5 shows an embodiment of the sensor 13 including a carrier 1, 1' and having at both ends thereof bores 7 for fastening the suspension devices 8.

Between the bores 7 of the carrier 1, 1', magnetizable flat surfaces 2, 21 are arranged on either side of the carrier 1, 1'.

In the exploded view of FIG. 5, the positioning devices 23, which secure the pairs of sensor coils 15, 16 with the associated sensor coils 12 in the associated plane 11 opposite the plane 9 of the carrier 1, are shown spaced apart from the flat metal surfaces 2, 21.

Non-magnetic ferrules isolating the suspension device 8 from the carrier 1 are denoted by reference numeral 25.

In the illustration of FIG. 5, a metal shield 26 is shown above the carrier 1.

The sensor shown in FIG. 5 is protected by means of the two housing parts 27, 28.

The fastening means 24 are provided for connecting the two housing parts 27, 28.

Figure 6:
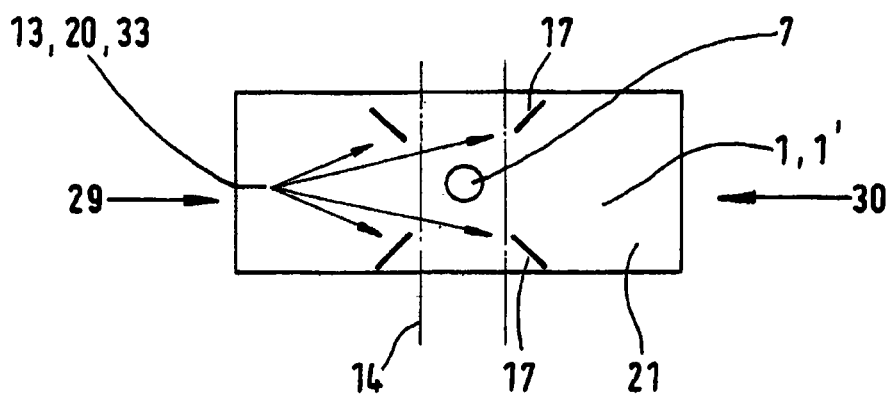
FIG. 6 shows a second embodiment of the sensor.

In a further embodiment of the invention, FIG. 6 shows a carrier 1, 1' with a magnetizable flat metal surface 21 having a bore 7.

The pairs of sensor coils 20, 33 are shown on the surface 21 of the carrier 1, 1'.

The pairs of sensor coils 20, 33 are each arranged at a 45-degree angle 17 in relation to the longitudinal axis 14 of the carrier 1.

A compressive force acting on the carrier 1, 1' is indicated by the arrows 29, 30.

Figure 7:
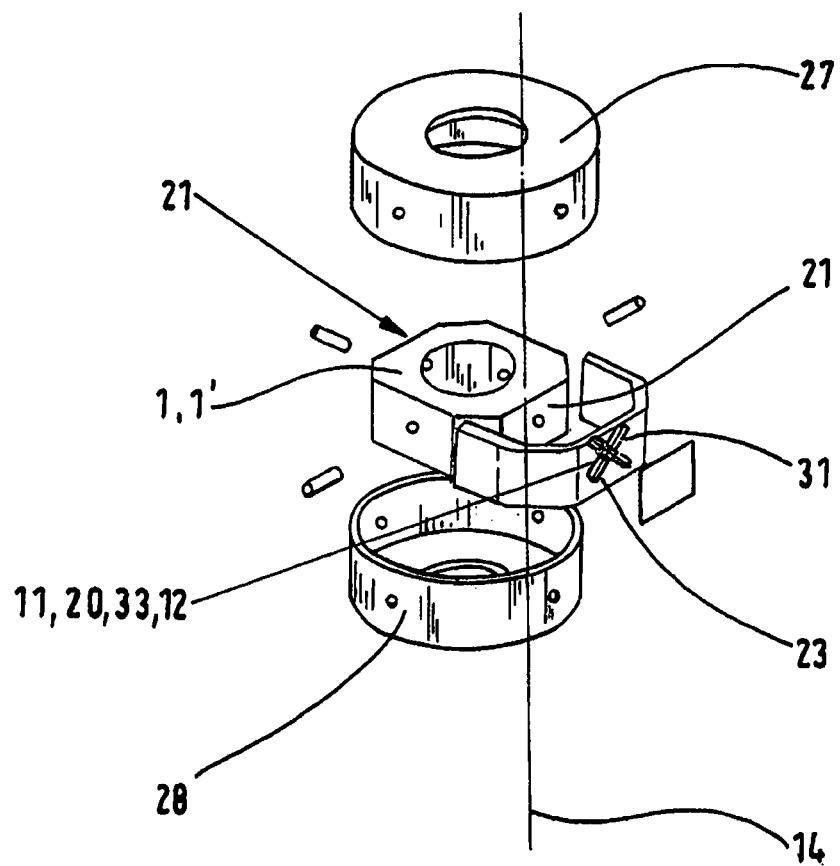
FIG. 7 shows a third embodiment of the sensor.

FIG. 7 shows a sensor with a carrier 1, 1' having a flat magnetisable metal surface 2, 21 on opposite sides respectively.

By means of the positioning device 23, the sensor coils 12 of the pairs of sensor coils 20, 33 are secured in the plane 11 opposite the plane 9 of the carrier 1, 1'.

In the positioning device 23, recesses 31 are shown in which the pairs of sensor coils 20, 33 with their sensor coils 12 are secured at a 45-degree angle 17 to the longitudinal axis 14 of the carrier 1, 1'.

In FIG. 7, the two housing parts 27, 28 are shown above and below the carrier.

Fastening means 24 are provided for securing the housing parts 27, 28 and the positioning devices 23 to one another.

REFERENCE NUMERALS 1 carrier
1' carrier
2 surface
3 magnet
4 rotational axis
5 radius
6 magnetic track
7 bore
8 suspension device
9 plane carrier
10 plane magnet
11 plane coils
12 sensor coil
13 sensor
14 longitudinal axis
15 pair of sensor coils
16 sensor coil
17 45-degree angle
18 fastening point
19 arrow tensile force
20 first pair of sensor coils
21 surface
22 bore
23 positioning device
24 fastening means
25 ferrule
26 metal shield
27 housing part
28 housing part
29 arrow
30 arrow
31 recess
32 axis
33 second pair of sensor coils
34 axis
35 plane

What is claimed is:

1. A sensor (13) having at least one planar magnetizable surface (2) and at least two sensor coils (12, 15) arranged at a predetermined angle to a longitudinal axis (14) of a carrier (1, 1') such that the sensor (13) is configured to detect changes of the magnetization due to a tensile, compressive and bending forces acting on the carrier (1, 1'); wherein the at least two sensor coils (12,15) form a first pair of coils (20) arranged on a plane (32) extending axially parallel to the carrier (1,1'), wherein the at least two sensor coils (12,15) have a predetermined spacing from one another, the predetermined spacing of the sensor coils (12,15) is changeable in a manner so as to change the angle (17) of the sensor coils (12, 15) to the longitudinal axis (14) of the carrier (1, 1') and set a sensitivity of the sensor.

2. A sensor according to claim 1, characterized in that the magnetization (6) of the planar magnetizable surface (2) of the carrier (1, 1') has a shape corresponding to a closed circular path.

3. A sensor according to claim 1, characterized in that the magnetization (6) takes place on both sides of the longitudinal axis (14) of the planar magnetizable surface (2) of the carrier (1, 1').

4. A sensor according to claim 1, characterized in that the coils (12, 15) are arranged spaced apart from the planar magnetizable surface (2) of the carrier (1, 1').

5. A sensor according to claim 1, characterized in that a further pair of coils (33) is arranged on a further axis (34) and the coils (12, 15) thereof are spaced apart from one another, wherein the said further axis (34) extends in a plane (35) parallel to the plane of the planar magnetizable surface (2) at an angle to the first axis (32) of the first pair of coils (20).

6. A sensor according to claim 1, characterized in that the predetermined angle is an angle between 0 degrees and 90 degrees to the longitudinal axis (14) of the carrier (1, 1').

7. A sensor according to claim 1, characterized in that the predetermined angle is an angle between 30 degrees and 60 degrees to the longitudinal axis (14) of the carrier (1, 1').

8. A sensor according to claim 1, characterized in that the predetermined angle is an angle of approximately 45 degrees to the longitudinal axis (14) of the carrier (1, 1').

9. A sensor according to claim 1, characterized in that the first pair of coils (20) are arranged at an angle of 0 degrees to 90 degrees to the longitudinal axis (14) of the carrier (1, 1').

10. A sensor according to claim 1, characterized in that the first pair of coils (20) are arranged at an angle of 30 degrees to 60 degrees to the longitudinal axis (14) of the carrier (1, 1').

11. A sensor according to claim 1, characterized in that the first pair of coils (20) are arranged at an angle of approximately 45 degrees to the longitudinal axis (14) of the carrier (1, 1').

12. A sensor according to claim 1, characterized in that the carrier (1, 1') has the shape of a disc.

13. A sensor according to claim 1, characterized in that the carrier (1, 1') has at least one suspension device (8).

14. A sensor device according to claim 1, further comprising at least one connecting wire and/or a signal receiver and/or an evaluation unit in communication with the sensor (13).

15. A method for detecting tensile, compressive and bending forces acting on a carrier (1, 1') by means of a sensor (13), characterized by the following steps:
providing a sensor (13) comprising a carrier (1,1') having at least one planar metal surface (2) and at least two sensor coils (12, 15), wherein the coils (12,15) form a first pair of coils (20) and are arranged on a plane (32) extending axially parallel to the carrier (1,1'), wherein the at least two sensor coils (12,15) have a predetermined spacing from one another;
positioning a magnet (3) in the region of the planar metal surface (2) of the carrier (1, 1'), wherein the magnet (3)

and the flat surface (2) of the carrier (1, 1') are arranged in planes (10, 9) which are each parallel to one another, moving one of the magnet (3) and the carrier (1, 1') relative to the other in the respectively associated plane (10, 9), generating an approximately annular magnetization (6) on the flat metal surface (2), changing the angle (17) of the sensor coils (12, 15) relative to the longitudinal axis (14) of the carrier (1, 1') so as to set a sensitivity of the sensor;

applying a tensile, compressive and bending force on the carrier (1, 1'), and detecting the changes of the magnetization (6) in response to the tensile, compressive and bending force being applied to the carrier (1, 1').

16. A method according to claim 15, further comprising:

providing at least one connecting wire, signal receiver, and evaluation unit in communication with the sensor (13).

17. A method according to claim 15, wherein the step of moving one of the magnet (3) and the carrier (1, 1') relative to the other in the respectively associated plane (10, 9) includes moving one of the magnet (3) and the carrier (1, 1') in the respective plane (10, 9) within a predetermined radius (5) about its respective axis.

* * * * *